(12) United States Patent
Shaeffer et al.

(10) Patent No.: US 8,841,958 B1
(45) Date of Patent: Sep. 23, 2014

(54) HIGH-VOLTAGE CHARGE PUMP

(71) Applicant: InvenSense, Inc., Sunnyvale, CA (US)

(72) Inventors: Derek Shaeffer, Redwood City, CA (US); Baris Cagdaser, Sunnyvale, CA (US)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 13/793,899

(22) Filed: Mar. 11, 2013

(51) Int. Cl.
  *G05F 1/10* (2006.01)
  *G05F 3/02* (2006.01)
(52) U.S. Cl.
  CPC .......................................... *G05F 3/02* (2013.01)
  USPC .......................................................... 327/536
(58) Field of Classification Search
  CPC ................................ H02M 3/073; H02M 3/07
  USPC ....................... 327/530, 534–537; 363/59, 60
  See application file for complete search history.

(56) References Cited

U.S. PATENT DOCUMENTS

| | | | |
|---|---|---|---|
| 6,091,594 A * | 7/2000 | Williamson et al. ........... | 361/111 |
| 6,091,657 A | 7/2000 | Chen et al. | |
| 6,804,552 B2 | 10/2004 | Thompson et al. | |
| 6,912,082 B1 | 6/2005 | Lu et al. | |
| 7,176,732 B2 * | 2/2007 | Innocent ......................... | 327/157 |
| 7,382,176 B2 * | 6/2008 | Ayres et al. .................... | 327/536 |
| 7,466,189 B2 * | 12/2008 | Sohara et al. .................. | 327/536 |
| 7,548,365 B2 | 6/2009 | Huffman et al. | |
| 7,633,095 B1 | 12/2009 | Kerr et al. | |
| 7,656,221 B2 * | 2/2010 | Maejima ........................ | 327/534 |
| 8,004,354 B1 | 8/2011 | Pu et al. | |
| 8,035,148 B2 | 10/2011 | Goldstein | |
| 2010/0245809 A1 | 9/2010 | Andreou et al. | |
| 2011/0018616 A1 | 1/2011 | Li et al. | |

OTHER PUBLICATIONS

Roberto Pelliconi, et al., "Power Efficient Charge Pump in Deep Submicron Standard CMOS Technology", IEEE Journal of Solid-State Circuits, vol. 38, No. 6, Jun. 2003, pp. 1068-1071.
Akira Umezawa, et al., "A 5-V-Only Operation 0.6-um Flash EEPROM with Row Decoder Scheme in Triple-Well Structure", IEEE Journal of Solid-State Circuits, vol. 27, No. 11, Nov. 1992, pp. 1540-1546.

* cited by examiner

*Primary Examiner* — Lincoln Donovan
*Assistant Examiner* — Sibin Chen
(74) *Attorney, Agent, or Firm* — Sawyer Law Group, P.C.

(57) ABSTRACT

A charge pump circuit is disclosed. The charge pump circuit comprises a transfer capacitor receiving a first clock phase and a driving capacitor receiving a second clock phase, the second clock phase opposite to the first clock phase. The circuit includes a first switch coupling an input node to the transfer capacitor. The first switch being controlled by the driving capacitor. The circuit further includes a second switch coupling the input node to the driving capacitor. The second switch being controlled by the transfer capacitor. The circuit also includes a third switch coupling the transfer capacitor to an output node. The third switch being controlled by the driving capacitor. The third switch operating in phase opposition to the first switch. The circuit finally includes a charge storage capacitor coupled to the output node.

13 Claims, 5 Drawing Sheets

HIGH-VOLTAGE CHARGE PUMP

CROSS REFERENCE TO RELATED APPLICATION

This application is related to U.S. patent application Ser. No. 13/071,374, filed on Mar. 24, 2011, entitled "HIGH-VOLTAGE MEMS APPARATUS AND METHOD", which is incorporated herein by reference.

FIELD OF THE INVENTION

The present invention relates generally to integrated circuits and more particularly to the generation of boosted voltages using a charge pump circuit.

BACKGROUND OF THE INVENTION

Many electronic systems rely on the use of boosted voltages in excess of a given supply voltage. For example, microelectromechanical systems (MEMS) may use boosted voltage to bias a proof mass to improve the sensitivity of a MEMS sensor. In some cases, a boosted voltage may be used to supply a high-voltage driver to allow for application of increased electrostatic force to actuate a MEMS device.

A class of voltage boosters known as charge pumps provides elevated voltage depositing charge onto storage capacitors arranged in a sequential chain of individual pumping stages. Voltage is boosted to increasing levels along the chain, and voltages well in excess of the input supply can be produced. Desirable characteristics of charge pumps include low parasitics, high pumping efficiency and low ripple. It is also desirable to be able to generate large voltages without exceeding the breakdown voltage of the devices used in the charge pump chain. For compatibility with low-cost manufacturing processes, it is sometimes desirable to have charge pumps in which devices with comparatively low breakdown voltages may nonetheless be used in the individual pumping stages to produce very large output voltages. For example, in some situations it may be desirable to produce a bias voltage in excess of 20V using devices rated to only 2V. In such cases, a large number of stages may be employed to achieve the required voltage boosting ratio. Thus, to further minimize cost, it is desirable to minimize the number of components required for the individual charge pump stages.

Thus, there is a need for charge pumps providing high efficiency and low ripple in a manner compatible with the use of relatively low breakdown voltage components wherein the number of components required for each pumping stage is minimized. The present invention addresses such a need.

SUMMARY OF THE INVENTION

A charge pump circuit is disclosed. The charge pump circuit comprises a transfer capacitor receiving a first clock phase and a driving capacitor receiving a second clock phase, the second clock phase opposite to the first clock phase. The circuit includes a first switch coupling an input node to the transfer capacitor. The first switch being controlled by the driving capacitor. The circuit further includes a second switch coupling the input node to the driving capacitor. The second switch being controlled by the transfer capacitor. The circuit also includes a third switch coupling the transfer capacitor to an output node. The third switch being controlled by the driving capacitor. The third switch operating in phase opposition to the first switch. The circuit finally includes a charge storage capacitor coupled to the output node.

DETAILED DESCRIPTION

The present invention relates generally to generating boosted voltages using a charge pump. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
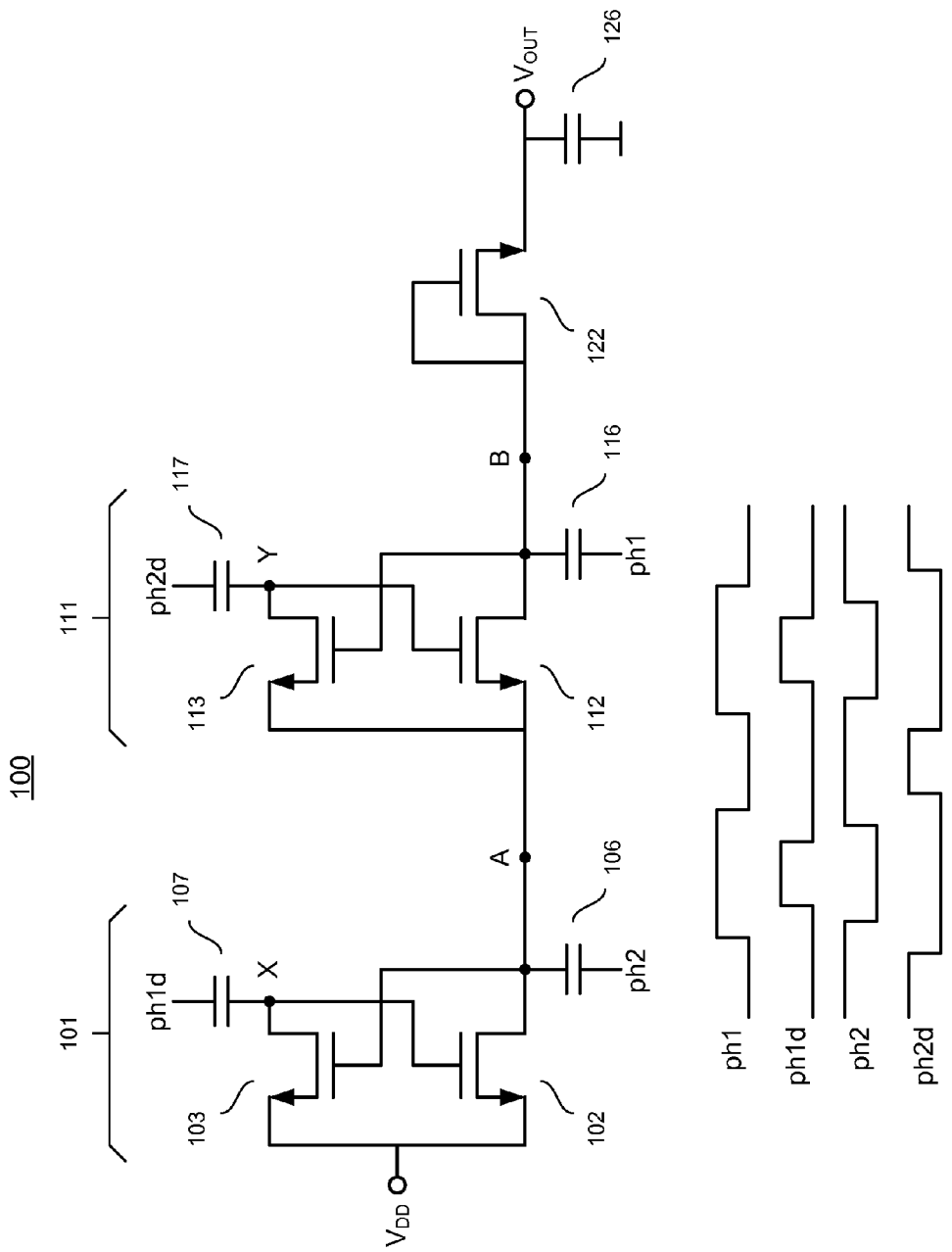
FIG. 1 illustrates a prior-art charge pump providing a boosted output voltage.

An exemplary charge pump 100 known in the art is illustrated in FIG. 1. The charge pump 100 produces a boosted output voltage, $V_{OUT}$, in excess of an input supply voltage, $V_{DD}$. The steady-state operation of the charge pump 100 can be described with reference to two basic operating periods. In a first operating period, phase 1, stage 101 is in a charging phase while stage 111 is in a pumping phase. In phase 1, transfer capacitor 106 charges to $V_{DD}$ potential from the input supply when signal ph1d goes high. Driving capacitor 107 was previously charged to $V_{DD}$ potential so that when signal ph1d goes high, the gate of NMOS switch 102 drives up to a potential close to $2*V_{DD}$ so that the switch is strongly on. In the second operating period, phase 2, node A is boosted high to $2*V_{DD}$ and when signal ph2d goes high, transfer capacitor 116 charges to $2*V_{DD}$ potential via NMOS switch 112. Driving capacitor 117 was previously charged to $2*V_{DD}$ potential so that when signal ph2d goes high, the gate of NMOS switch 112 is boosted to a potential close to $3*V_{DD}$ so that the switch is strongly on. During phase 2, driving capacitor 107 is refreshed from the input supply via NMOS switch 103. During the next phase 1 interval, node B is boosted high to $3*V_{DD}$, transferring charge to the charge storage capacitor 126 via diode-connected NMOS device 122. The steady-state voltage at $V_{OUT}$ is therefore equal to $3*V_{DD}$ minus a diode voltage, provided that there is no static load current. To generalize for a system of N stages, the steady-state output voltage is equal to $(N+1)*V_{DD}$ minus a diode voltage, provided that there is no static load current.

The exemplary prior-art charge pump 100 of FIG. 1 has several limitations. First, the output voltage, $V_{OUT}$, is reduced by one diode drop compared to the maximum voltage at node B. The diode drop reduces the efficiency of the charge pump 100. Second, the swing at nodes A and B is $V_{DD}$, and the peak swing at these nodes occurs on opposite phases so that the NMOS devices 102-103 and 112-113 must withstand relatively large voltages as high as $2*V_{DD}$ across their terminals. These large voltages can pose a reliability hazard unless the devices are rated to a voltage in excess of this value. Third, for proper operation the charge pump 100 requires a relatively complex clocking scheme employing four clocks with edges arranged in a specific phase relationship to provide optimal pumping efficiency. The required relationship is illustrated qualitatively in FIG. 1. Finally, nodes X and Y in the circuit do not have proper discharge paths so that when the charge pump 100 is disabled, charge may be trapped at these nodes while nodes A and B can discharge through diode 122. The charge trapping can pose a serious reliability hazard, particularly in charge pumps with many cascaded stages.

Figure 2:
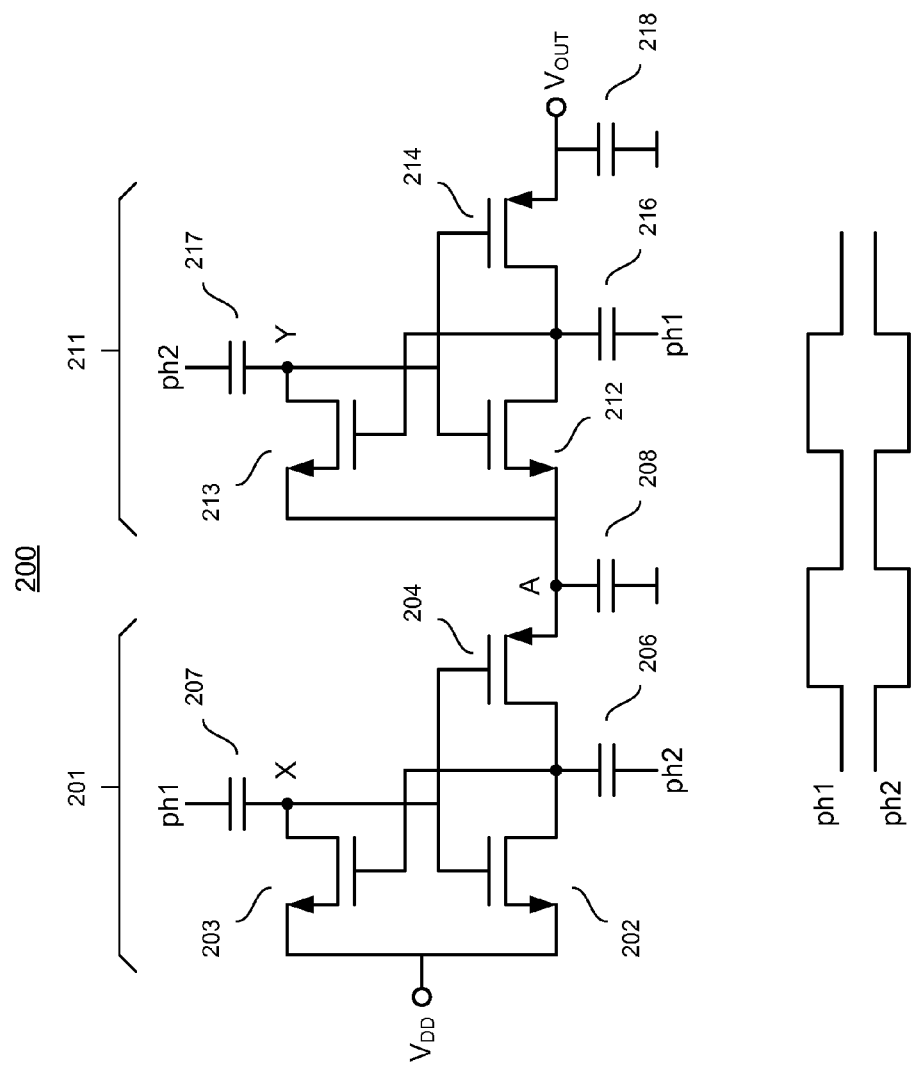
FIG. 2 illustrates a first embodiment of a charge pump according to the present invention.

FIG. 2 illustrates a first embodiment of a charge pump 200 according to the present invention. This embodiment addresses the first three of the above-identified limitations. In this embodiment, PMOS devices 204 and 214 are introduced, allowing NMOS diode 122 to be removed. Thus, all stages in the charge pump 200 chain operate based on switches and no efficiency is lost due to charging the output through a diode. Charge storage capacitors 208 is inserted at node A to store the output charge of the first stage 201. In steady-state operation, node A settles to a fixed potential of $2*V_{DD}$ since node A is not clocked. Since node A has a fixed voltage of $2*V_{DD}$ and node X swings between $V_{DD}$ and $2*V_{DD}$, none of the devices 202-204 of the first stage 201 see terminal voltages in excess of $V_{DD}$. Thus, the required voltage rating of the devices is half that of the charge pump 100 shown in FIG. 1. The introduction of PMOS devices 204 and 214 and charge storage capacitor 208 reduces the stage-to-stage interaction so that a simple two-phase clocking scheme is sufficient. The steady-stage output voltage, VOUT, is $3*V_{DD}$ for the embodiment of FIG. 2. Generalizing to an arrangement of N stages, one expects an output voltage of $(N+1)*V_{DD}$, provided that there is no static load current.

Figure 3:
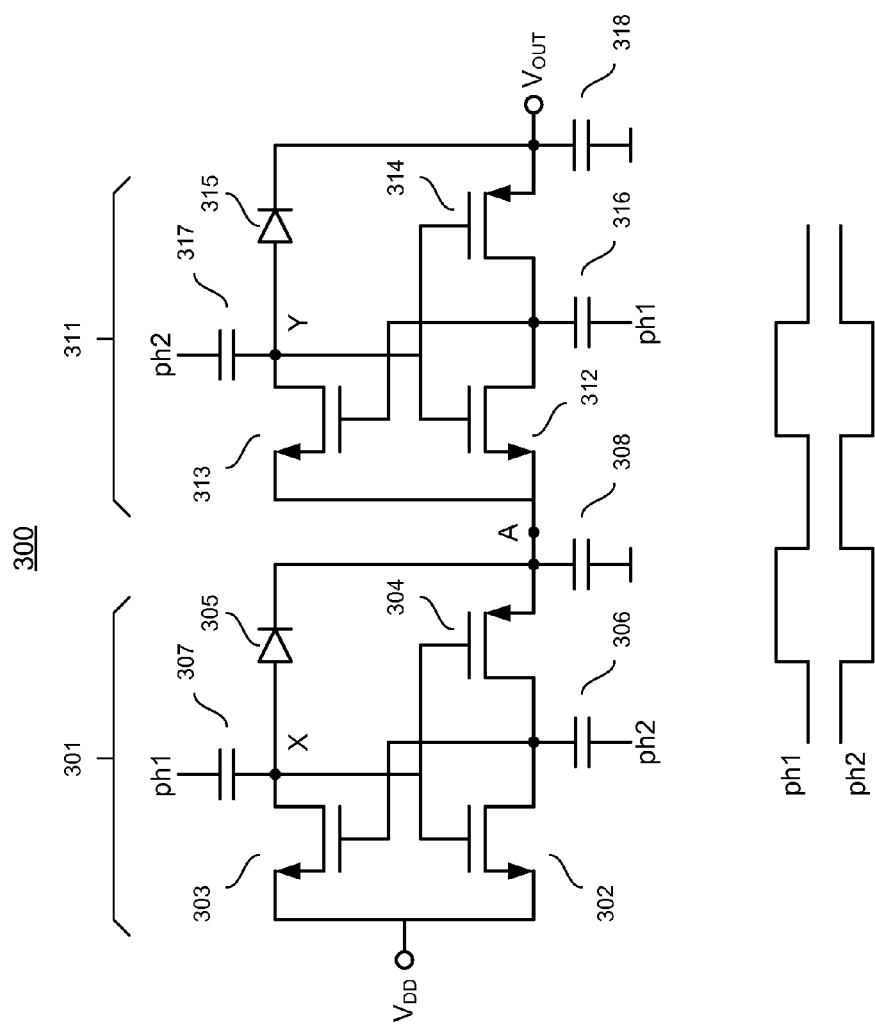
FIG. 3 illustrates a second embodiment of a charge pump according to the present invention.

FIG. 3 illustrates a second embodiment of a charge pump 300 according to the present invention. The final limitation of the charge pump 100 of FIG. 1 is addressed by this embodiment. In this embodiment, clamp diodes 305 and 315 are introduced to provide discharge paths to nodes X and Y. When the charge pump 300 is powered down and node $V_{OUT}$ discharges, clamp diodes 305 and 315 clamp nodes X and Y to nodes A and $V_{OUT}$ so that devices 302-304 and 312-314 never experience voltages in excess of $V_{DD}$, their required voltage rating for steady-state operation. During steady-state operation, clamp diodes 305 and 315 conduct no current and are therefore in the off state.

Figure 4:
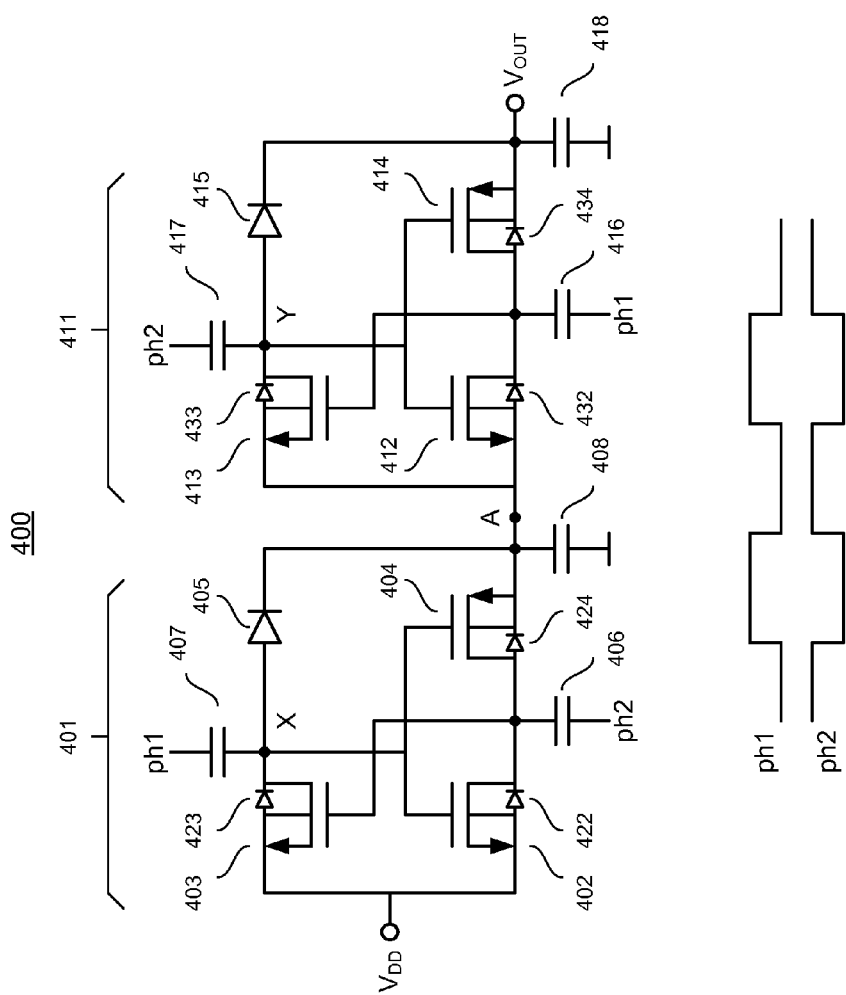
FIG. 4 illustrates more details of the embodiment of FIG. 3 related to the bulk connections of the transistors therewithin.

The discussion of the embodiments of FIGS. 2 and 3 has so-far focused on steady-state behavior. The start-up behavior of the present invention can be understood with reference to FIG. 4 which shows the embodiment of FIG. 3 with added details concerning the bulk connections of the NMOS devices 402-403, 412-413 and PMOS devices 404 and 414. For all of these devices, the bulk is connected to the source so that all of the parasitic diodes 422-424, 432-434 associated with the sources and drains of the devices are reverse-biased in steady-state operation. However, during start-up, these parasitic diodes assist with initial charge pumping. As can be seen in FIG. 4, parasitic diodes 422-424 and clamp diode 405 in the first stage 401 form a diode bridge. Similarly, parasitic diodes 432-434 and clamp diode 415 in the second stage 411 form another diode bridge. During start-up, there is initially insufficient voltage for all switches to act robustly. During start up, pumping occurs via the diode bridges, with upper and lower halves of the bridge delivering charge during opposite phases. After several cycles, enough voltage has built up at the internal node A and output node VOUT for the switches to start turning on normally. In steady-state operation, the flow of charge occurs by switch operation, and the parasitic diodes 422-424, 432-434 and clamp diodes 405, 415 remain off.

Multiple stages according to the present invention may be cascaded to produce higher output voltages. An embodiment of the present invention shown in FIG. 5 cascades N charge pump stages with alternating stages operating on alternating clock phases. By a cascade of N stages 541-545, a steady-state output voltage of $(N+1)*V_{DD}$ may be produced, provided that there is negligible load current. The intermediate voltages at nodes A, B, C, D, etc. are sequentially boosted by $V_{DD}$ volts per stage. Each of the individual stages 541-545 comprises an arrangement of devices such as shown in FIG. 4, including two NMOS devices (such as 402-403) with associated parasitic diodes (such as 422-423), one PMOS device (such as 404) with associated parasitic diode (such as 424), one clamp diode (such as 405), one charge transfer capacitor (such as 406) and one driving capacitor (such as 407).

Figure 5:
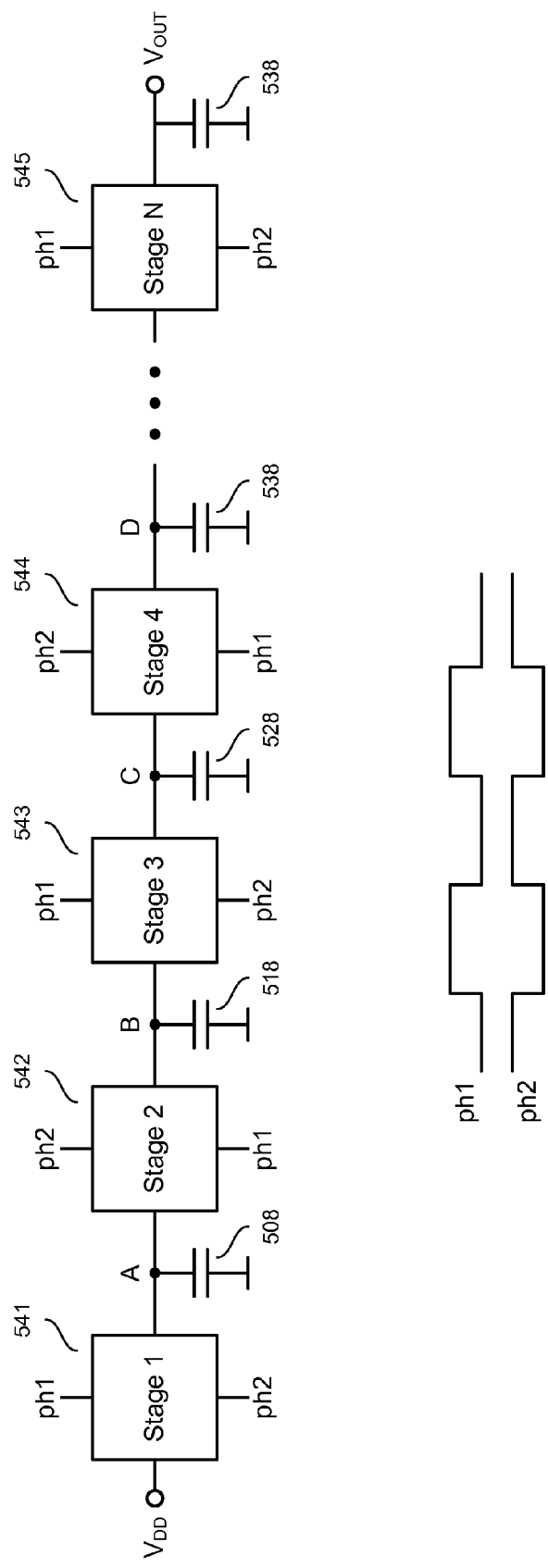
FIG. 5 a charge pump system that includes cascaded N cascaded charge pump stages with alternating stages operating on alternating clock phases.

A charge pump comprising a cascade of multiple stages as shown in FIG. 5 may be employed in a system such as that shown in FIG. 6. In this embodiment, a cascade of N stages 601-604 produces a bias voltage, $V_{BIAS}$, for a MEMS device 651. The N stages 601-604 may be contained in corresponding high-voltage isolation regions 611-614 located within a common substrate 681. The bias voltage, $V_{BIAS}$, is monitored by controller 661 via an attenuator 671 comprising resistors 672-673. The controller 661 produces the two clock phases necessary for driving the cascade of N stages 601-604. By adjusting the clock pulse density or frequency of the two clock phases, the controller may adjust the drive current supplied to the attenuator 671 by the cascade of N stages 601-604 and thereby regulate the bias voltage, $V_{BIAS}$, to a fixed voltage. By these means, a regulated high-voltage bias is provided for the MEMS device.

For testing the drive current capability of the charge pump, a cascoded arrangement of NMOS devices 620-624 is provided to convey a programmable test current supplied by current source 641 to the $V_{BIAS}$ node at the output of the cascade of N stages 601-604. The NMOS devices 621-624 sit within corresponding high-voltage isolation regions 631-634. By these means, the charge pump system may be tested without the need to directly observe the high voltage bias node.

It should be noted that none of the transistors used in the N-stages 601-604 or the controller circuitry 661 or the cascoded NMOS devices 620-624 are required to tolerate high voltages. The transistors used in the N-stages 601-604 are only required to tolerate terminal voltages as high as $V_{DD}$. The high-voltage bias, $V_{BIAS}$, is coupled to the controller through attenuator 671 so that the reduced attenuator output voltage is also within the voltage rating of the transistors used in controller 661. High-voltage isolation regions 611-614 and 631-634 ensure that parasitic diode breakdown to the common substrate 681 is also avoided. Advantageously, by these means a high-voltage bias for the MEMS device is provisioned without the need to employ transistors with a high voltage rating.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A charge pump circuit, comprising:
   a transfer capacitor receiving a first clock phase;
   a driving capacitor receiving a second clock phase, the second clock phase opposite to the first clock phase;
   a first switch coupling an input node to the transfer capacitor, the first switch controlled by the driving capacitor;
   a second switch coupling the input node to the driving capacitor, the second switch controlled by the transfer capacitor;
   a third switch coupling the transfer capacitor to an output node, the third switch controlled by the driving capacitor, the third switch operating in phase opposition to the first switch;
   a first diode coupled to the driving capacitor and the output node, the first diode clamping a voltage of the driving capacitor to the output node, thereby preventing the first, second and third switches from experiencing voltages in excess of their required voltage rating during discharge; and
   a charge storage capacitor coupled to the output node, wherein during steady state operation the first diode conducts no current and is in an off state.

2. The charge pump circuit of claim 1, wherein each of the first, second and third switches comprises a transistor.

3. The charge pump circuit of claim 2, wherein each of the first, second and third transistors include a parasitic diode therewithin; wherein the parasitic diodes of the first second and third transistors and the first diode form a diode bridge; wherein the diode bridge assists with initial charge pumping.

4. A charge pump system, comprising:
   a plurality of charge pump stages coupled together;
   wherein each of the stages comprises a transfer capacitor receiving a first clock phase; a driving capacitor receiving a second clock phase, the second clock phase opposite to the first clock phase; a first switch coupling an input node to the transfer capacitor, the first switch controlled by the driving capacitor; a second switch coupling the input node to the driving capacitor, the second switch controlled by the transfer capacitor; a third switch coupling the transfer capacitor to an output node, the third switch controlled by the driving capacitor, the third switch operating in phase opposition to the first switch; a first diode coupled to the driving capacitor and the output node, the first diode clamping a voltage of the driving capacitor to the output node, thereby preventing the first, second and third switches from experiencing voltages in excess of their required voltage rating during discharge; and a charge storage capacitor coupled to the output node, wherein during steady state operation the first diode conducts no current and is in an off state.

5. The charge pump system of claim 4, wherein the plurality of stages are coupled together in a cascade fashion, wherein alternating stages operating on alternating clock phases.

6. The charge pump system of claim 5, wherein each of the first, second and third switches comprises a transistor.

7. The charge pump system of claim 6, wherein each of the first, second and third transistors include a parasitic diode therewithin; wherein the parasitic diodes of the first second and third transistors and the first diode form a diode bridge; wherein the diode bridge assists with initial charge pumping.

8. A MEMS system comprising:
   a MEMS device; and
   a charge pump coupled to the MEMS device, the charge pump comprising a plurality of stages, wherein each of the stages comprises a transfer capacitor receiving one of a first or second clock phase; a driving capacitor receiving the other of a first or second clock phase, the second clock phase opposite to the first clock phase; a first switch coupling an input node to the transfer capacitor, the first switch controlled by the driving capacitor; a second switch coupling the input node to the driving capacitor, the second switch controlled by the transfer capacitor; a third switch coupling the transfer capacitor to an output node, the third switch controlled by the driving capacitor, the third switch operating in phase opposition to the first switch; a first diode coupled to the driving capacitor and the output node, the first diode clamping a voltage of the driving capacitor to the output node, thereby preventing the first, second and third switches from experiencing voltages in excess of their required voltage rating during discharge; and a charge storage capacitor coupled to the output node; wherein during steady state operation the first diode conducts no current and is in an off state.

9. The MEMS system of claim 8, which includes a controller for providing the first and second clock phases for sensing an output of the plurality of stages via an attenuator.

10. The MEMS system of claim 9, wherein the controller adjusts the clock pulse density to adjust the drive current provided by the plurality of stages to the attenuator.

11. The MEMS system of claim 9, wherein the controller adjusts the clock frequency to adjust the drive current provided by the plurality of stages to the attenuator.

12. The MEMS system of claim 9, wherein a cascoded arrangement of NMOS devices conveys a programmable test current supplied by a current source to the output of the plurality of stages.

13. The MEMS system of claim 12, wherein the test current source is programmable.

* * * * *